United States Patent [19]

Bayer

[11] Patent Number: 4,850,722

[45] Date of Patent: Jul. 25, 1989

[54] ANTIFRICTION BEARING WITH PULSE RING FOR MEASUREMENT OF SPEED ROTATION

[75] Inventor: Oswald Bayer, Aidhausen, Fed. Rep. of Germany

[73] Assignee: FAG Kugelfischer Georg Schafer (KGaA), Fed. Rep. of Germany

[21] Appl. No.: 257,340

[22] Filed: Oct. 13, 1988

[30] Foreign Application Priority Data

Oct. 16, 1987 [DE] Fed. Rep. of Germany ....... 3735070

[51] Int. Cl.$^4$ ............................................. F16C 19/06
[52] U.S. Cl. ...................................... 384/448; 384/477
[58] Field of Search ............... 384/448, 477, 484, 485, 384/486; 340/682

[56] References Cited

U.S. PATENT DOCUMENTS

| | | | |
|---|---|---|---|
| 4,584,865 | 4/1986 | Hutchins | 340/682 |
| 4,688,951 | 8/1987 | Guers | 384/448 |
| 4,783,180 | 11/1988 | Hayashi | 384/448 |
| 4,795,278 | 1/1989 | Hayashi | 384/448 |

FOREIGN PATENT DOCUMENTS

86/04148 7/1986 PCT Int'l Appl. .
1386020 8/1972 United Kingdom .

*Primary Examiner*—Lenard A. Footland
*Attorney, Agent, or Firm*—Ostrolenk, Faber, Gerb & Soffen

[57] ABSTRACT

An antifriction bearing with an outer ring, inner ring, a row of balls between the rings and an open radial space between the rings. A sealing disc at one axial side of the rings seals the open space between the outer and inner rings. The sealing disc also serves as a pulse ring. It comprises a metal part having a plurality of openings of preferably rectangular cross-section through it. The metal part is at least partially surrounded by a covering nonmetallic layer of plastic or rubber which also fills the openings. The sealing disc is attached to one of the rings, and preferably to the outer ring to rotate with the outer ring with respect to the other, inner ring and the sealing disc is sealed to the inner ring.

13 Claims, 1 Drawing Sheet

ANTIFRICTION BEARING WITH PULSE RING FOR MEASUREMENT OF SPEED ROTATION

BACKGROUND OF THE INVENTION

The present invention relates to an antifriction bearing and particularly to a pulse ring for measuring the speed of bearing rotation.

Antifriction bearings of this type are known from Federal Republic of Germany Published Application Nos. OS 2,218,047 and OS 2,831,637. In both cases, a pulse ring having teeth on it is arranged between the races of an antifriction bearing. The inhomogeneities produced by the teeth permit measurement of the rotation speed by a sensor while the pulse ring moves past the sensor. These embodiments, however, have a substantial drawback. They require an additional part in the form of a pulse ring, which must also be mounted The additional part also increases the weight of the bearing.

SUMMARY OF THE INVENTION

The object of the present invention is to improve an antifriction bearing which measures rotation speed and which is simple, light, dependably operable and precise embodiment of a pulse ring.

An antifriction bearing according to the invention includes the outer ring, the inner ring radially inward of the outer ring and the row of bearing rolling elements, particularly balls, disposed between the rings, which roll over the raceways of the rings. At at least one axial end of the rings, the radial space between the rings is sealed by an annular shape sealing disc. The sealing disc is held to and moves with one of the rings, preferably the outer ring, and sealingly but slidingly engages the other ring, preferably the inner ring.

The sealing disc according to the invention serves as a pulse ring. It is comprised of an annular shape metal strip or ring. The metal pulse ring rotates with the one bearing ring, particularly the outer ring. A plurality of openings, having a preferably rectangular cross-section, are defined in the metal ring at spaced intervals around the ring. A sensor senses the passage of the rectangular openings past the sensor. With stored information as to the number, width and spacing of the openings and as to the size of the bearing, the sensor can measure the speed of rotation of the ring on which the sealing disc is supported with respect to the sensor. The sensor may be supported stationary and/or may be supported on the other ring past which the sealing disc slides. In the latter case, the other ring may be stationary. Alternatively the sensor may also be supported to the other ring to rotate with the other ring and thereby to provide an accurate measurement of the speed of rotation of the one ring to which the sensor is not supported.

Any known appropriate sensor might be used, an electrical sensor, a sensor that determines the presence of metal by measuring a change in an electric and/or a magnetic field as the metal moves past, or even an optical sensor if the openings are exposed.

The openings in the metal ring are preferably of rectangular cross-section so that the sensor will achieve an accurate reading that is not dependent upon the precise radial position over the sealing disc at which the reading is made. For example, readings made at circular openings require precise radial positioning of the readings so that the readings are not affected by the change in cross-section of circular openings over their radial height.

In a preferred embodiment, the metallic part of the sealing disc is surrounded, either in whole or in part, by plastic or rubber or other resilient material covering. The plastic or rubber covering defines a lip which is held in a receptacle in the one bearing ring to which the sealing disc is secured and also defines a sealing lip or lips at the other bearing ring over which the covering slides. The resilience of that covering material helps assure the seal. Although the plastic or rubber covering material may fill the openings in the metal part, nonetheless a sensor dependent upon the presence or absence of metal will not have its sensing function adversely affected.

Because the metal part of a sealing disc is also developed as a pulse ring, no additional parts are required on the bearing to achieve the additional rotation speed count. It is merely necessary to provide openings on the metal part of the sealing disc, and such a sealing disc is normally required anyway. These openings can be produced in a simple manner by being stamped simultaneously during the production of the metal part. No increase in the weight of the bearing results. In fact, the sealing disc even is lighter, since portions of its metal are removed by the stamping.

So that a precise speed measurement can be carried out, the metal part has a plurality of preferably rectangular openings This assures that even at low speeds of rotation of the antifriction bearing, precise measurement of the speed of rotation is possible. The rectangular openings permit precise determination of the number and spacing of pulses and thus permit exact determination of the speed of rotation. In contrast to the requirement for sensing round openings, exact positioning of the sensor is unnecessary and changes in position between the pulse ring and the sensor caused by operation do not impair the precision of the measurement. The particular advantage therefore resides in the fact that the pulse ring and sealing disc are integrated with each other and perform both functions without problems Despite the presence of the openings, in order that an optimally functioning sealing disc be obtained, the metal part may be surrounded in whole or in part by plastic or rubber covering material. The openings are also thereby filled up. This does not have a negative effect on the rotation measurement since the sensor is acted on only by the inhomogeneities in the metal part. But the surrounding plastic or rubber material does increase the sealing effect.

Sealing discs provided with holes in their metal part are already known, as in British Patent No. 862,171. However, those holes serve the entirely different purpose of insertion openings for relubricating devices. Furthermore, the holes are round and are only few in number, which would make exact measurement of the speed of rotation impossible.

Other objects and features of the present invention will become apparent from the following description of the preferred embodiments of the invention considered in conjunction with the accompanying drawings.

DESCRIPTION OF A PREFERRED EMBODIMENT

Figure 1:
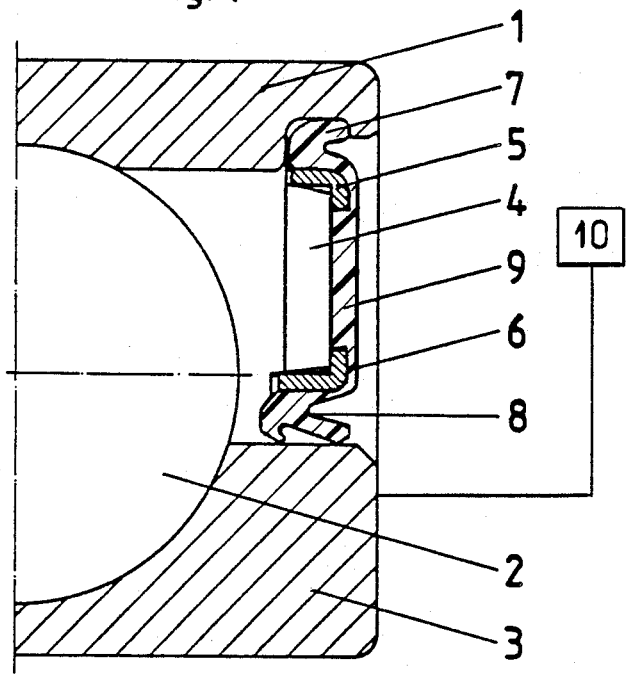
FIG. 1 is a partial cross-section through a ball bearing having the sealing disc of the invention, which serves as a pulse ring.

The ball bearing of FIG. 1 comprises the outer ring 1, the row of bearing balls 2, the inner ring 3 and the sealing disc 4 sealing the axial end of the opening between the rings.

The sealing disc 4 comprises an annular metal part 5 in the form of an annular strip or ring, which is practically completely surrounded by a nonmetallic plastic material or a rubber material covering layer and part 6. The metal part is of a shorter radial height than the space between the rings and does not engage the rings. The part 6 extends radially above and below the metal part and also forms the attachment flange 7 for attaching the sealing disc to the outer ring 1 for their rotation together and forms the sealing lips 8 which are resiliently biased to rest against and slide over the outer surface of the inner ring.

Figure 2:
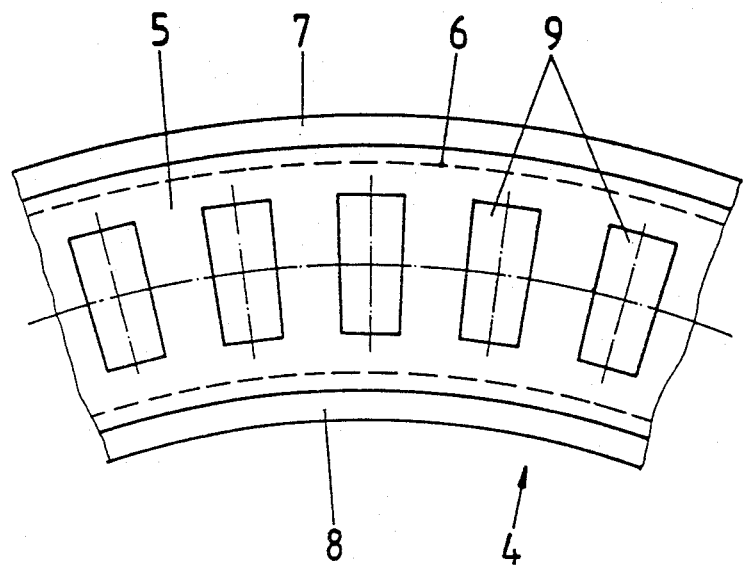
FIG. 2 is an axial view of a portion of the sealing ring of FIG. 1.

As can be noted particularly from FIG. 2, a plurality of identically sized and shaped rectangular openings 9 are provided in the metal part 5. The openings are all oriented so that, measured around the sealing disc, each rectangular opening has a center line along a radius of the bearing. The sealing disc 4 can be used as a pulse ring for measuring the speed of rotation of the outer ring if the openings 9 are arranged opposite a sensor 10, and the outer ring 1 rotates together with the sealing disc 4. This method of measurement is not disturbed even if the openings 9 are filled with plastic, which occurs as the metal part is surrounded by the covering layer. A large enough number of rectangular openings 9 in the part 5 permits an exact measurement of the speed of rotation even at low speeds of rotation of the ball bearing.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. An antifriction bearing with a pulse ring for measuring the speed of rotation of the bearing, the bearing comprising:

an outer ring of the bearing, an inner ring of the bearing spaced radially inward from the outer ring of the bearing and a row of bearing rolling elements guided between the outer and inner rings and rolling therebetween; the bearing having a radial space defined between the inner and outer rings; the bearing having an axial side;

generally toward the axial side of the bearing, an annular sealing disc is disposed in the radial space between the inner ring and the outer ring and seals that radial space; the sealing disc being comprised of an annular metal part held to one of the rings and moving with the one ring and moving with respect to the other ring as the rings rotate relative to one another; a plurality of openings defined in the metal part for being sensed as the pulse ring rotates with the one ring.

2. The antifriction bearing of claim 1, wherein the openings in the metal part are of rectangular cross-section.

3. The antifriction bearing of claim 2, wherein measured around the sealing disc, each rectangular opening has a center line, and each center line of a rectangular opening is along a radius of the bearing.

4. The antifriction bearing of claim 3, wherein all the rectangular openings have the same shape.

5. The antifriction bearing of claim 2, wherein the metal part is at least in part surrounded by nonmetallic material.

6. The antifriction bearing of claim 5, wherein the nonmetallic material is a plastic.

7. The antifriction bearing of claim 5, wherein the nonmetallic material is a rubber.

8. The antifriction bearing of claim 5, wherein the nonmetallic material so surrounds the metal part as to fill the openings through the metal part.

9. The antifriction bearing of claim 5, wherein the metal part is of a radial height that it does not extend into contact with either of the inner and outer rings of the bearing and the nonmetallic part extends radially beyond the metal part to engage the one ring and to seal against the other ring.

10. The antifriction bearing of claim 9, wherein the nonmetallic material completely surrounds the metal part.

11. The antifriction bearing of claim 9, wherein the sealing disc is secured to the outer ring to rotate along with the outer ring and the sealing disc ride over the inner ring as the outer ring rotates with respect to the inner ring.

12. The antifriction bearing of claim 1, wherein the sealing disc is secured to the outer ring to rotate along with the outer ring and the sealing disc ride over the inner ring as the outer ring rotates with respect to the inner ring.

13. The antifriction bearing of claim 1, wherein the antifriction bearing is a ball bearing and the rolling elements are bearing balls and the outer and inner rings of the bearing support the bearing walls.

* * * * *